United States Patent [19]

Kim

[11] Patent Number: 5,555,028
[45] Date of Patent: Sep. 10, 1996

[54] POST-PROCESSING METHOD AND APPARATUS FOR USE IN AN IMAGE SIGNAL DECODING SYSTEM

[75] Inventor: Sang-Ho Kim, Seoul, Rep. of Korea

[73] Assignee: Daewoo Electronics Co., Ltd., Seoul, Rep. of Korea

[21] Appl. No.: 496,588

[22] Filed: Jun. 29, 1995

[30] Foreign Application Priority Data

Jun. 30, 1994 [KR] Rep. of Korea ................ 94-15373

[51] Int. Cl.⁶ .................................................. H04N 5/21
[52] U.S. Cl. ................ 348/607; 348/625; 382/262; 382/272
[58] Field of Search ........................... 348/571, 607, 348/624, 708, 625, 630; 358/21 R, 36, 37, 160, 167, 166; 382/260, 262, 266, 268, 270, 273; H04N 5/14, 9/64, 5/21, 5/213

[56] References Cited

U.S. PATENT DOCUMENTS 5,280,350 1/1994 DeHaan ................................ 348/607

OTHER PUBLICATIONS

Scene Adaptive Coder; IEEE Transactions on Communications, vol. Com. 32 No. 3, Mar. 1984; William K. Pratt, Senior Member IEEE.

A Motion-Compensated Interframe Coding Scheme For Television Pictures; IEEE Transactions on Comm. vol. Com-30, #1, Jan. 1982; Y. Ninomiya & Y. Ohtsuka.

Fixed & Adaptive Predictors For Hybrid Predictive/Transform Coding; IEEE Transactions on Communications vol. Com-33, No. 12, Dec. 1985; S. Ericsson.

*Primary Examiner*—Safet Metjahic
*Assistant Examiner*—Sherrie Hsia
*Attorney, Agent, or Firm*—Anderson Kill Olick & Oshinsky, P.C.

[57] ABSTRACT

A post-processing filter apparatus for use in an image signal decoding system, capable of improving the image quality of the system, comprises a memory for storing decoded image data of a current frame; a filter for filtering target pixel data in the stored decoded image data to thereby produce filtered target pixel data, wherein the target pixel data represents the value of a pixel to be filtered; a calculator for calculating an absolute difference value between an original target pixel data and the filtered target pixel data; a first circuit for selectively generating a first or a second threshold value based on the decoded image data and the target pixel data; a second circuit for updating the stored target pixel data with the filtered target pixel data if the absolute difference value is smaller than the generated threshold value; and a third circuit for sequentially updating the stored target pixel value with corrected target pixel data T times if the absolute difference value is equal to or larger than the generated threshold value.

10 Claims, 3 Drawing Sheets

POST-PROCESSING METHOD AND APPARATUS FOR USE IN AN IMAGE SIGNAL DECODING SYSTEM

FIELD OF THE INVENTION

The present invention relates to a post-processing method and apparatus for use in an image signal decoding system; and, more particularly, to an improved method and apparatus capable of removing a blocking effect present at the boundary of a block of decoded image data by effectively post-processing the decoded image data in accordance with a spatial activity of the block, to thereby improve the image quality of the system.

DESCRIPTION OF THE PRIOR ART

In various electronic/electrical applications such as high definition television and video telephone systems, an image signal may need be transmitted in a digitized form. When the image signal is expressed in the digitized form, there is bound to occur a large amount of digital data. Since, however, the available frequency bandwidth of a conventional transmission channel is limited, in order to transmit the image signal therethrough, the use of an image encoding system often becomes necessary to compress the large amount of digital data. Among various video compression techniques, the so-called hybrid coding technique, which combines temporal and spatial compression techniques together with a stastical coding technique, is known to be most effective.

Most hybrid coding techniques employ an adaptive inter/intra mode coding, othogonal transform, quantization of transform coefficients, RLC(run-length coding), and VLC(variable length coding). The adaptive inter/intra mode coding is a process of selecting a video signal for a subsequent othogonal transform from either PCM(pulse code modulation) data of a current frame or DPCM(differential pulse code modulation) data adaptively, e.g., based on a variance thereof. The inter-mode coding, also known as the predictive method, which is based on the concept of reducing the redundancies between neighboring frames, is a process of determining the movement of an object between a current frame and its one or two neighboring frames, and predicting the current frame according to the motion flow of the object to produce an error signal representing the difference between the current frame its prediction. This coding method is described, for example, in Staffan Ericsson, "Fixed and Adapted Predictors for Hybrid Predictive/Transform Coding", *IEEE Transactions on Communications, COM*-33, No. 12, pp. 1291–1301 (December 1985); and in Ninomiya and Ohtsuka, "A Motion-compensated Interframe Coding Scheme for Television Pictures", *IEEE Transaction on Communications, COM*-30, No. 1, pp. 201–210 (January 1982), both of which are interpolated herein by reference.

The othogonal transform, which exploits the spatial correlationships between image data such as PCM data of the current frame or motion compensated DPCM data and reduces or removes spatial redundancies therebetween, converts a block of digital image data into a set of transform coefficients. This technique is described in Chen and Pratt, "Scene Adaptive Coder", *IEEE Transactions on Communications, COM*-32, No. 3, pp. 225–232 (March 1984). By processing such transform coefficient data with quantization, zigzag scanning, RLC, and VLC, the amount of data to be transmitted can be effectively compressed.

The encoded image data is transmitted through a conventional transmission channel to an image signal decoder included in an image signal decoding system of a receiver, which performs an inverse process of the encoding operation to thereby reconstruct the original image data. The reconstructed image data normally exhibits an annoying artifact such as a blocking effect wherein the border line of a block becomes visible at the receiver. Such blocking effect occurs since a frame is encoded on a block-by-block basis.

As is well known in the art, to improve the quality of the reconstructed image data or decoded image data, generally, the decoded image data is further processed by employing a post-processing filter. The prior art post-processing filter performs the filtering of the decoded image data with a predetermined cutoff frequency to thereby enhance the quality of the decoded image data.

However, as the post-processing filtering is performed without due regard paid to individual filtered pixel data, such filtering may not substantially reduce the blocking effect at the boundary of a block or may generate distorted image data.

Another type of post-processing technique contemplated for use in reducing the blocking effect is the one disclosed in a copending commonly assigned application, U.S. Ser. No. 08/431,880, "IMPROVED POST-PROCESSING METHOD FOR USE IN AN IMAGE SIGNAL DECODING SYSTEM". This technique provides an improved performance of reducing the blocking effect at the boundary of a block of decoded image data by repeatedly post-processing it based on respective filtered image data. However, the post-processing technique performs the repetitive filtering operation without having considering the spatial activity or complexity of each block contained in the decoded image data, which may not always provide a satisfactory poor post-processing for the decoded image data.

SUMMARY OF THE INVENTION

It is, therefore, a primary object of the invention to provide a post-processing method and apparatus for use in an image signal decoding system capable of considerably reducing or eliminating the blocking effect present at the boundary of a block of decoded image data by effectively post-processing the decoded image data in accordance with the spatial activity of the block, thereby improving the quality of the image in the system.

In accordance with one aspect of the invention, there is provided a method, for use in an image signal decoding system, for post-processing, on a pixel-by-pixel basis, decoded image data of a current frame from an image signal decoder included in the image signal decoding system, comprising the steps of:

(a) storing the decoded image data of the current frame;

(b) filtering target pixel data in the stored decoded image data to thereby produce filtered target pixel data, wherein the target pixel data represents the value of a pixel to be filtered;

(c) calculating an absolute difference value between an original target pixel data and the filtered target pixel data;

(d) selectively generating a first or a second predetermined threshold value based on the decoded image data and the target pixel data;

(e) updating the stored target pixel data with the filtered target pixel data if the absolute difference value is smaller than the generated threshold value;

(f) repeating said steps (b) to (e) T times if the absolute difference value is smaller than the generated threshold value and updating the stored target pixel value with corrected target pixel data if the absolute difference value is equal to or larger than the generated threshold value, wherein the corrected target pixel data is derived by adding the generated threshold value to the original target pixel data if the original target pixel data is smaller than the filtered target pixel data, and by subtracting the generated threshold value from the original target pixel data if the original target pixel data is larger than the filtered target pixel data; and (g) repeating said steps (b) to (f) for a next target pixel until all of the pixels included in the decoded image data of the current frame are post-processed.

In accordance with another aspect of the invention, there is provided an apparatus, for use in an image signal decoding system, for post-processing, on a pixel-by-pixel basis, decoded image data of a current frame from an image signal decoder included in the image signal decoding system, which comprises:

means for storing the decoded image data of the current frame;

means for filtering target pixel data in the stored decoded image data to thereby produce filtered target pixel data, wherein the target pixel data represents the pixel value of a pixel to be filtered;

means for calculating an absolute difference value between an original target pixel data and the filtered target pixel data;

means for selectively generating a first or a second predetermined threshold value based on the decoded image data and the target pixel data;

means for updating the stored target pixel data with the filtered target pixel data if the absolute difference value is smaller than the generated threshold value; and means for sequentially updating the stored target pixel value with corrected target pixel data T times if the absolute difference value is equal to or larger than the generated threshold value, wherein the corrected target pixel data is derived by adding to the original target pixel data the generated threshold value if the original target pixel data is smaller than the filtered target pixel data, and by subtracting the generated threshold value from the original target pixel data if the original target pixel data is greater than the filtered target pixel data.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
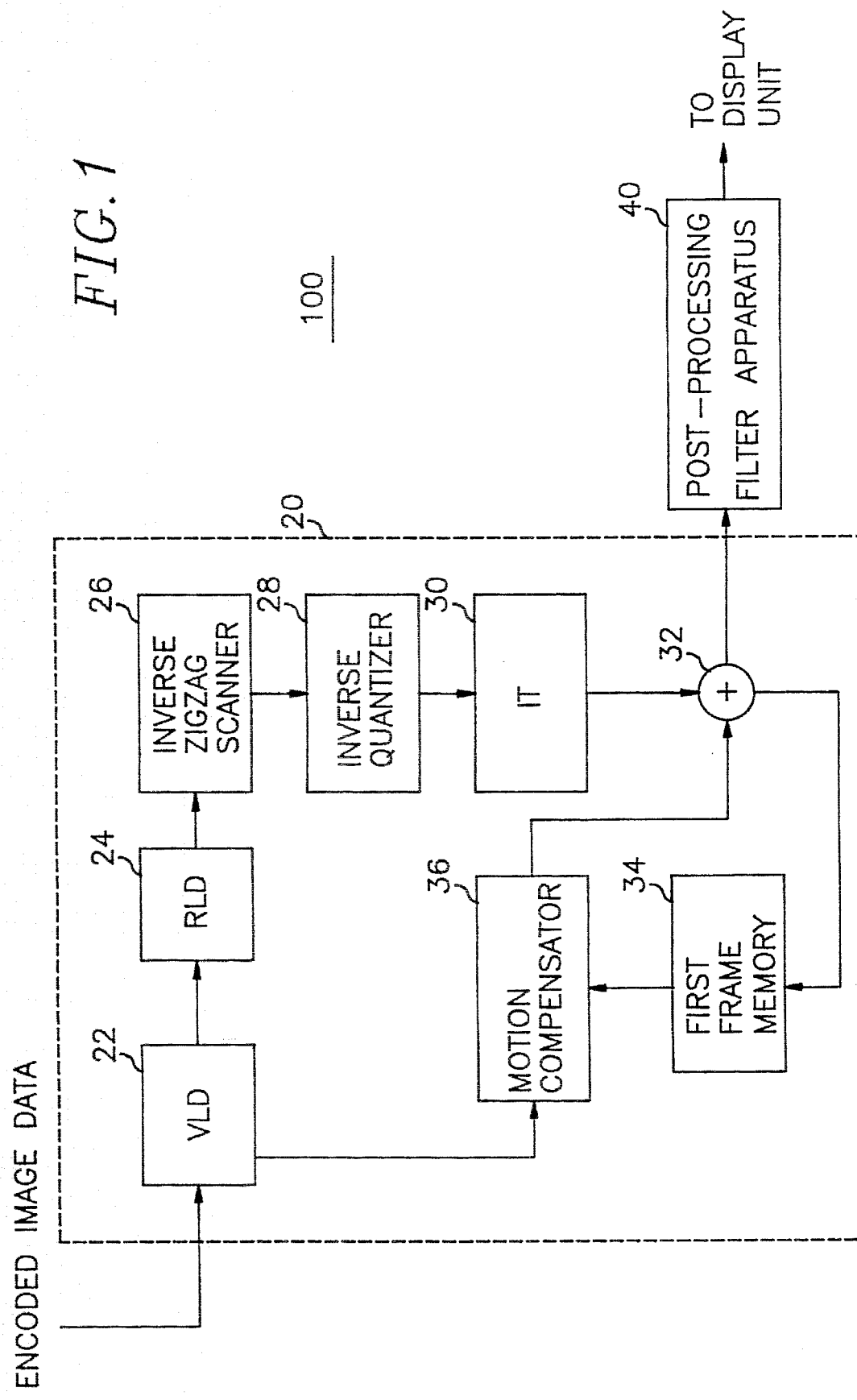
FIG. 1 shows a block diagram of an image signal decoding system employing a post-processing filter apparatus of the present invention.

Referring to FIG. 1, there is shown a novel image signal decoding system 100 for explaining the post-processing method and apparatus of the present invention. The image signal decoding system 100 comprises an image signal decoder 20 and a post-processing filter apparatus 40, wherein the image signal decoder 20 includes a variable length decoder(VLD) 22, a run-length decoder(RLD) 24, an inverse zigzag scanner 26, an inverse quantizer 28, an inverse transformer(IT) 30, an adder 32, a first frame memory 34 and a motion compensator 36.

In the image signal decoder 20, encoded image data, i.e., a set of variable length coded transform coefficients and motion vectors is provided to the VLD 22 on a block-by-block basis. The VLD 22 serves to decode the set of variable length coded transform coefficients and the motion vectors to provide run-length coded transform coefficients to the RLD 24 and the motion vectors to the motion compensator 36, respectively. The VLD 22 is basically a look-up table: that is, in the VLD 22, a plurality of code sets is provided to define the respective relationships between the variable length codes and their run-length codes or motion vectors. Thereafter, the run-length coded transform coefficients are applied to the RLD 24, which is also a look-up table, for generating zigzag scanned transform coefficients. The zigzag scanned transform coefficients are then provided to the inverse zigzag scanner 26.

At the inverse zigzag scanner 26, the zigzag scanned transform coefficients are reconstructed to provide blocks of quantized transform coefficients. Each block of quantized transform coefficients is then converted into a set of transform coefficients at the inverse quantizer 28. Subsequently, the set of transform coefficients is fed to the IT 30, e.g., inverse discrete cosine transformer, which transforms the set of transform coefficients into a set of difference data between a block of a current frame and its corresponding block of a previous frame. The set of difference data is then sent to the adder 32.

In the meanwhile, the motion compensator 36 extracts a set of corresponding pixel data from the previous frame stored in the first frame memory 34 based on a motion vector, which corresponds to each block of the current frame, from the VLD 22 and provides the set of extracted pixel data to the adder 32. The set of extracted pixel data from the motion compensator 36 and the set of pixel difference data from the IT 30 are then summed up at the adder 32 to thereby provide reconstructed image data of a given block of the current frame. Thereafter, the reconstructed image data or decoded image data of the block is supplied to the first frame memory 34 for the storage thereof and to the post-processing filter apparatus 40 for post-processing.

At the post-processing filter apparatus 40 of the present invention, post-processing of the decoded image data from the adder 32 is carried out to effectively filter the decoded image data and the post-processed image data is transmitted to a display unit(not shown).

Figure 2:
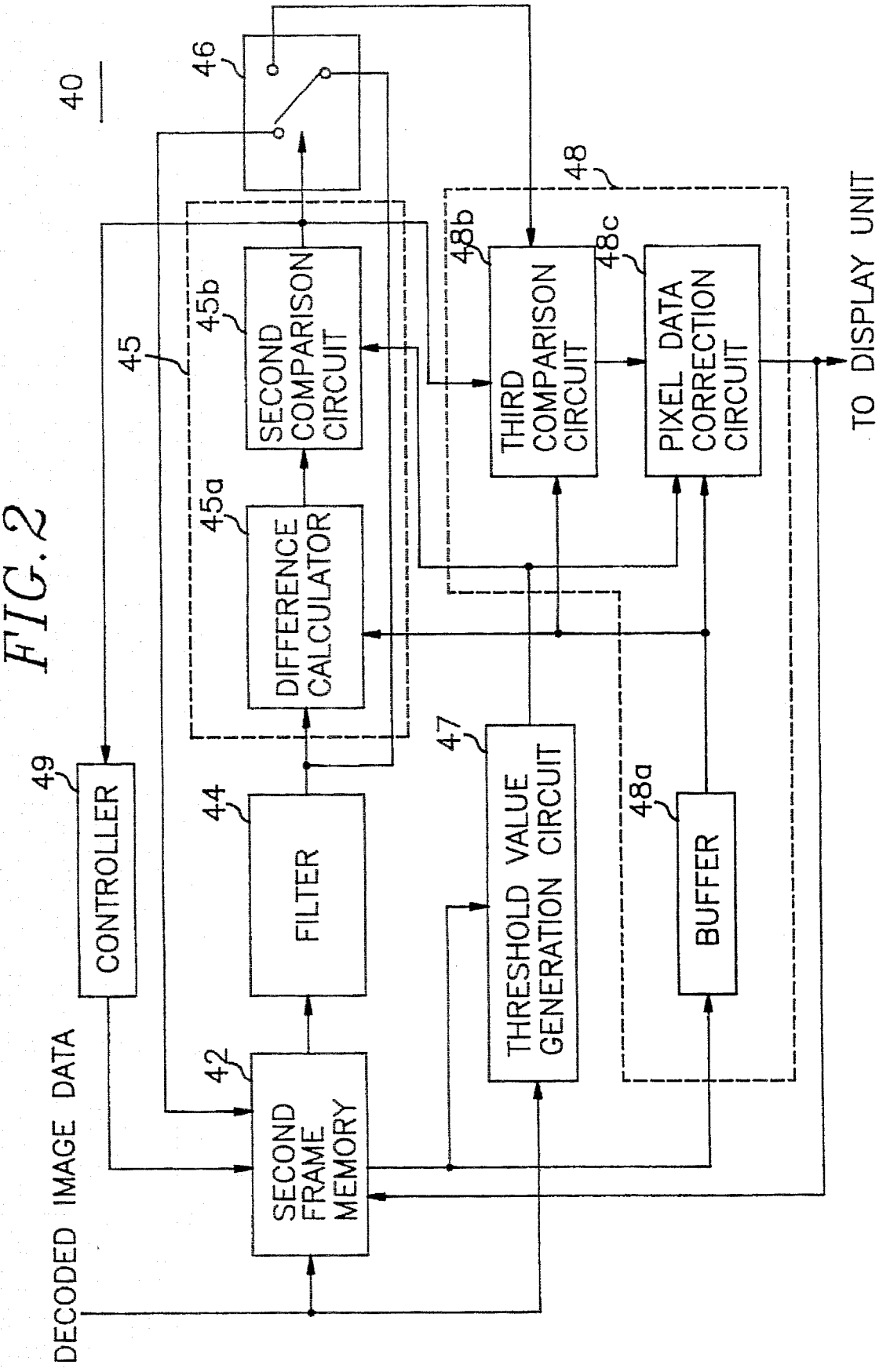
FIG. 2 represents a detailed block diagram of the post-processing filter apparatus shown in FIG. 1.

Turning now to FIG. 2, there is illustrated a detailed block diagram of the post-processing filter apparatus 40 shown in FIG. 1 for explaining a post-processing scheme of the present invention.

The post-processing filter apparatus 40, which comprises a second frame memory 42, a filter 44, a pixel data evaluation circuit 45, a switching circuit 46, a threshold value generation circuit 47, a pixel data correction unit 48 and a controller 49, provides post-processed image data of the decoded image data by filtering each of the pixels included therein on a pixel-by-pixel basis.

The decoded image data of the current frame from the image signal decoder 20 shown in FIG. 1 is first provided to the second frame memory 42 for the storage thereof and is also applied to the threshold value generation circuit 47. In response to a first memory control signal MCS1 from the controller 49, the value of a target pixel stored therein is retrieved and provided to the threshold value generation circuit 47 and a buffer 48a of the pixel data correction unit 48, while pixel data for its neighboring P×P, e.g., 3×3, pixels are fed to the filter 44, wherein the target pixel denotes the pixel to be filtered and is located at the center of the P×P pixels, P being a positive integer.

The filter 44, which receives the P×P pixel data from the second frame memory 42, performs the filtering process thereof with a predetermined cutoff frequency to thereby generate filtered target pixel data. The filter 44 can be implemented by using such a conventional low pass filter as a Median filter or Laplacian filter well known in the art. It should be noted that the predetermined cutoff frequency of the filter 44 can be determined based on the required image quality of the image signal decoding system. Thereafter, the filtered target pixel data from the filter 44 is supplied to the pixel data evaluation circuit 45 which includes a difference calculator 45a and a second comparison circuit 45b.

The difference calculator 45a serves to calculate a difference value between the original target pixel data stored in the buffer 48a and the filtered target pixel data from the filter 44 and convert the difference value into its absolute value. The absolute difference value derived at the difference calculator 45a is then applied to the second comparison circuit 45b.

In the meantime, the threshold value generation circuit 47 selectively generates a first or a second predetermined threshold value by using a novel threshold value generation scheme of the invention. The first or the second predetermined threshold value is then fed to the second comparison circuit 45b and a pixel data correction circuit 48c of the pixel data correction unit 48.

Figure 3:
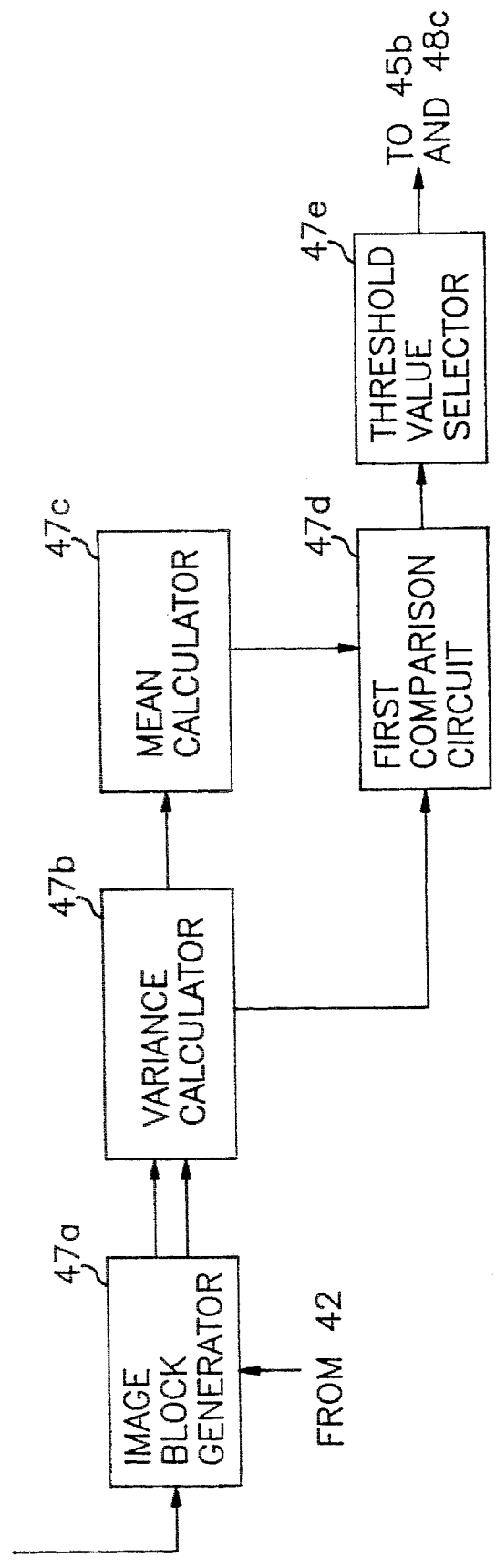
FIG. 3 illustrates a detailed block diagram of the threshold value generation circuit depicted in FIG. 2.

Referring to FIG. 3, there is shown a detailed block diagram of the threshold value generation circuit 47 of the present invention. The threshold value generation circuit 47 comprises an image block generator 47a, a variance calculator 47b, a mean calculator 47c, a first comparison circuit 47d and a threshold value selector 47e.

In the inventive threshold value generation scheme, the image block generator 47a divides the decoded image data of the current frame from the image signal decoder 20 into a plurality of image blocks to generate the divided image blocks, each image block including N×N, e.g., 8×8, pixels, wherein N is a positive integer; and produces information of a block containing the target pixel data from the second frame memory 42. Subsequently, the divided image blocks are sequentially coupled to the variance calculator 47b and the produced information is also supplied thereto.

At the variance calculator 47b, in order to calculate a spatial activity of each of the divided image blocks, a mean pixel value of each of the blocks, Bm, is calculated first by using a conventional mean calculation technique, and then a variance of the block, Bvar, is derived by using the calculated mean pixel value as follows:

$$Bvar = \frac{1}{N \cdot N} \sum_{i=1}^{N} \sum_{j=1}^{N} (X(i,j) - Bm)^2$$

wherein N is the number of pixels located in the horizontal and the vertical directions of a block and a positive integer; Bm is a mean pixel value of the block; and X(·) is a pixel value in the block.

The variances, Bvar's, for all of the image blocks derived at the variance calculator 47b are then provided to the mean calculator 47c, while the variance Bvar of a block containing the target pixel data is applied to the first comparison circuit 47d. At the mean calculator 47c, a mean Bvarm for the variance of all of the blocks is calculated by employing a known mean calculation algorithm. Subsequently, the mean Bvarm for all of the blocks calculated at the mean calculator 47c and the variance Bvar of the block containing the target pixel data from the variance calculator 47b are simultaneously fed to the first comparison circuit 47d.

The first comparison circuit 47d compares the variance Bvar of the image block containing the target pixel data from the variance calculator 47b with the mean Bvarm for the variance of all of the image blocks from the mean calculator 47c to produce a first selection signal SS1 representing whether the image block including the target pixel data complicates or not. In a preferred embodiment of the present invention, if the variance Bvar is larger than the mean Bvarm, i.e., contour information or complicated image of an object is found in the block, the first comparison circuit 47d generates a first logic high selection signal; and if the variance Bvar is equal to or smaller than the mean Bvarm, i.e., a smooth image of an object exists therein, it produces a first logic low selection signal.

Thereafter, the first logic high or logic low selection signal produced by the first comparison circuit 47d is supplied to the threshold value selector 47e which serves to select one of the first and second predetermined threshold values TH1 and TH2, prestored in a memory (not shown) thereof, in response to the first selection signal SS1, wherein the first and the second threshold values TH1 and TH2 are positive integers with TH2 being greater than TH1. It should be appreciated that the first and the second predetermined threshold values TH1 and TH2 can be determined based on the required image quality of the image signal decoding system. In accordance with the invention, these first and second predetermined threshold values TH1 and TH2 are preferably set as 4 and 6, respectively.

In response to the first logic high selection signal, the threshold value selector 47e serves to select the first threshold value TH1, i.e., 4, from the first and the second threshold values; and in response to the first logic low selection signal, it serves to choose the second threshold value TH2, i.e., 6, from the two threshold values. Subsequently, the first or the second threshold value selected by the threshold value selector 47e and the absolute difference value derived by the difference calculator 45a shown in FIG. 2 are simultaneously provided to the second comparison circuit 45b shown therein.

Referring back to FIG. 2, the second comparison circuit 45b compares the absolute difference value from the difference calculator 45a with one of the first and the second threshold values, selected and provided in accordance with the spatial activity of a block including the target pixel, from the threshold value selector 47e shown in FIG. 3 to thereby generate a second selection signal SS2. More specifically, the output from the second comparison circuit 45b is a second logic high selection signal if the absolute difference value is equal to or larger than the provided threshold value; and a second logic low selection signal if the absolute difference value is smaller than the provided threshold value. The second logic high or logic low selection signal produced at the second comparison circuit 45b is then fed to the switching circuit 46, a third comparison circuit 48b of the pixel data correction unit 48 and the controller 49.

The switching circuit 46, in response to the second selection signal SS2 from the second comparison circuit 45b, selectively couples the filtered target pixel data from the filter 44 to the pixel data correction unit 48 or the second frame memory 42. Specifically, in response to the second logic high selection signal, the filtered target pixel data is coupled to the pixel data correction unit 48 which is adapted for correcting the filtered target pixel data; and, in response to the second logic low selection signal, the filtered target pixel data is coupled to the second frame memory 42 which is adapted for updating the stored target pixel data with the filtered target pixel data.

As shown in FIG. 2, the pixel data correction unit 48 includes the buffer 48a, the third comparison circuit 48b and the pixel data correction circuit 48c. The pixel data correction unit 48 derives corrected target pixel data; and provides the same to the display unit and the second frame memory 42 wherein the stored target pixel data is updated with the corrected target pixel data. That is, in response to the second logic high selection signal, the third comparison circuit 48b compares the filtered target pixel data from the filter 44 via the switching circuit 46 with the original, or non-filtered target pixel data from the buffer 48a and generates a correction control signal CS1. Specifically, the third comparison circuit 48b generates a logic high correction control signal if the non-filtered or original target pixel data is larger than the filtered target pixel data; and a logic low correction control signal if it is smaller than the filtered target pixel data. The generated correction control signal CS1 from the third comparison circuit 48b is provided to the pixel data correction circuit 48c.

The pixel data correction circuit 48c, responsive to the correction control signal CS1, provides the corrected target pixel data based on the non-filtered target pixel data from the buffer 48a and the provided threshold value from the threshold value generation circuit 47. In a preferred embodiment of the present invention, if the input to the pixel data correction circuit 48c is a logic high correction control signal, the corrected target pixel data is obtained by subtracting the provided threshold value from the non-filtered target pixel data; and if the input thereto is a logic low correction control signal, it is derived by adding to the non-filtered original target pixel data the provided threshold value.

The controller 49, responsive to the second selection signal SS2 from the second comparison circuit 45b, controls the filtering process of the target pixel. That is, in response to the second logic high selection signal, the controller 49 generates a second memory control signal MCS2 to the second frame memory 42 to update the target pixel data stored therein with the corrected target pixel data from the pixel data correction circuit 48c; and provide from the memory 42 the pixel value for a next target pixel to the buffer 48a and the threshold value generation circuit 47 and P×P pixel data for the next target pixel to the filter 44 in order to initialize the filtering operation for the next target pixel.

On the other hand, if the second comparison circuit 45b issues the second logic low selection signal, the controller 49 generates a third memory control signal MCS3 to the memory 42 in order to update the stored target pixel data with the filtered target pixel data from the switching circuit 46; and the filtering operation for the target pixel is repeated by providing P×P pixel data including the updated target pixel value from the memory 42 to the filter 44. During the repeated filtering operation for the target pixel, the original target pixel data stored in the buffer 48a is not updated with the filtered target pixel data. The filtering operation for the target pixel is repeated until the second comparison circuit 45b issues the second logic high selection signal or the number of the first logic low selection signals issued by the second comparison circuit 45b reaches a predetermined number T, e.g., 5 wherein T is a positive integer. In case the number of the second logic low selection signals reaches the predetermined number, the controller 49 issues a fourth memory control signal MCS4 to the memory 42 to thereby update the stored target pixel data with the filtered target pixel data from the switching circuit 46 and provide the updated target pixel data to the display unit. Subsequently, the controller 49 provides a fifth memory control signal MCS5 to the memory 42 thereby initializing the filtering operation for a next target pixel by providing the next target pixel data to the buffer 48a and corresponding P×P pixel data to the filter 44.

As can be seen from the above, a contour or textured image of an object exists in an image block containing target pixel data in decoded image data, the target pixel data is post-processed by using the first threshold value to well preserve the image; and, a smooth image thereof is in the image block, it is post-processed by employing the second threshold value to considerably filter the image. As a result, the present invention is capable of substantially reducing or eliminating a blocking effect present at the boundary of the image block of the decoded image data by effectively performing the post-processing filtering operation thereof in accordance with the spatial activity of the image block, thereby improving the image quality.

While the present invention has been shown and described with respect to the particular embodiments, it will be apparent to those skilled in the art that many changes and modifications may be made without departing from the spirit and scope of the invention as defined in the appended claims.

What is claimed is:

1. A method, for use in an image signal decoding system, for post-processing, on a pixel-by-pixel basis, decoded image data of a predetermined number of pixels in a current frame from an image signal decoder included in the image signal decoding system, comprising the steps of:

(a) storing the decoded image data of the current frame to sequentially generate target pixel data from the stored decoded image data, said target pixel data representing the value of a pixel to be filtered;

(b) filtering the target pixel data to thereby produce filtered target pixel data;

(c) calculating an absolute difference value between an original target pixel data and the filtered target pixel data;

(d) selectively generating a first or a second predetermined threshold value based on the decoded image data and the target pixel data;

(e) updating the target pixel data with the filtered target pixel data if the absolute difference value is smaller than the generated threshold value;

(f) repeating said steps (b) to (e) T times if the absolute difference value is smaller than the generated threshold value and updating the target pixel data with corrected target pixel data if the absolute difference value is equal to or larger than the generated threshold value, wherein T is a positive integer and the corrected target pixel data is derived by adding to the original target pixel data the generated threshold value if the original target pixel data is smaller than the filtered target pixel data, and by subtracting the generated threshold value from the original target pixel data if the original target pixel data is greater than the filtered target pixel data; and (g) repeating said steps (b) to (f) for a next target pixel until all of the pixels included in the decoded image data of the current frame are post-processed.

2. The method according to claim 1, wherein the step (b) for filtering the target pixel data is carried out by using a median filter.

3. The method according to claim 2, wherein the step (d) for generating the first or the second predetermined threshold value includes the steps of:

(d1) dividing the decoded image data of the current frame into a plurality of image blocks, each image block having N×N pixels, wherein N is a positive integer;

(d2) calculating a variance parameter of each block on a block-by-block basis to thereby provide calculated variance parameters for all of the blocks;

(d3) deriving a mean parameter for the entire blocks of the decoded image data by employing the calculated variance parameters; and (d4) selectively generating the first or the second threshold value based on the mean parameter and the variance parameter corresponding to the image block including the target pixel data, selected from the calculated variance parameters.

4. The method according to claim 3, wherein the first and the second threshold values are 4 and 6, respectively.

5. An apparatus, for use in an image signal decoding system, for post-processing, on a pixel-by-pixel basis, decoded image data of a predetermined number of pixels in a current frame from an image signal decoder included in the image signal decoding system, which comprises:

means for storing the decoded image data of the current frame to sequentially generate target pixel data from the stored decoded image data, said target pixel data representing the pixel value of a pixel to be filtered;

means for filtering the target pixel data to thereby produce filtered target pixel data;

means for calculating an absolute difference value between an original target pixel data and the filtered target pixel data;

means for selectively generating a first or a second predetermined threshold value based on the decoded image data and the target pixel data;

means for updating the target pixel data with the filtered target pixel data if the absolute difference value is smaller than the generated threshold value; and means for sequentially updating the target pixel data with corrected target pixel data T times if the absolute difference value is equal to or larger than the generated threshold value, wherein T is a positive integer and the corrected target pixel data is derived by adding to the original target pixel data the generated threshold value if the original target pixel data is smaller than the filtered target pixel data, and by subtracting the generated threshold value from the original target pixel data if the original target pixel data is greater than the filtered target pixel data.

6. The apparatus according to claim 5, wherein said means for filtering the target pixel data is carried out by using a median filter.

7. The apparatus according to claim 6, wherein said means for generating the first or the second predetermined threshold value includes:

means for dividing the decoded image data of the current frame into a plurality of image blocks, each of the image blocks having N×N pixels, wherein N is a positive integer;

means for calculating a variance parameter of each block on a block-by-block basis to thereby provide calculated variance parameters for all of the blocks;

means for deriving a mean parameter for the entire blocks of the decoded image data by employing the calculated variance parameters; and means for selectively generating the first or the second threshold value based on the mean parameter and the variance parameter corresponding to the block including the target pixel data, selected from the calculated variance parameters.

8. The apparatus according to claim 7, wherein the first and the second threshold values are 4 and 6, respectively.

9. The method according to claim 4, wherein T and N are 5 and 8, respectively.

10. The apparatus according to claim 8, wherein T and N are 5 and 8, respectively.

* * * * *